United States Patent Office 2,776,196
Patented Jan. 1, 1957

2,776,196

COMPOSITIONS AND METHODS FOR INFLUENCING THE GROWTH OF PLANTS

Hans Gysin, Basel, and Enrico Knüsli, Riehen, near Basel, Switzerland, assignors to J. R. Geigy A. G., Basel, Switzerland, a Swiss firm No Drawing. Application August 23, 1954,
Serial No. 451,719

Claims priority, application Switzerland September 2, 1953

8 Claims. (Cl. 71—2.4)

The present invention is concerned with compositions which, due to their content of o-aryl carbamates, change or regulate the development of plant cells and so influence the growth of plants. It is also concerned with a method by which the growth characteristics of plants can be modified by the use of the active substances mentioned above.

It is known that N-phenyl carbamates of the general formula:

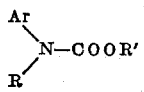

wherein R represents hydrogen or a low molecular alkyl radical, R' represents an alkyl group and Ar represents a phenyl radical substituted or unsubstituted as desired, have attained great importance because of their selective action as weed killers. Reference is made in this respect to N-phenyl-isopropyl carbamate (IPC) and N-(3-chlorophenyl)-isopropyl carbamate (CIPC).

Surprisingly, it has now been found that O-aryl carbamates of the general formula:

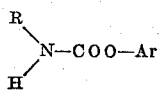

wherein Ar represents the phenyl or the naphthyl radical and R represents hydrogen or a lower straight chain alkyl radical, have a very marked inhibitory influence on the growth of plants, which offers several possibilities in practical application. As such can be named, e. g.

Inhibition or delaying of germination and
Prolongation of the harvest state of vegetables and fruits,
In addition
Modification of the leaf structure to increase productivity,
Delaying the blossom,
Blossom thinning,
Desiccation of crop plants,
Defoliation (complete or partial),
Selective weed killing,
Total eradication of plants.

Dependent on the intened use and the form of application, the concentration of the active ingredient in formulations ready for use can vary within wide limits. High concentrations can be used in particular in dusts for the treatment of the soil. Very low concentrations, on the other hand, can be used also when the active ingredients are applied to the soil in water (by watering) or with fertilisers. In soil treatment, there is, in general, no necessary relationship between the concentration and the amount of active ingredient taken up by the plant, since a lower concentration of active ingredient can be equalised by increasing the total amount of the agent applied. There is, therefore, a very great range of possible concentrations.

Directly dependent on the concentration however, is the amount of active ingredient taken up on the plant when it is applied in aqueous suspensions and emulsions which are sprayed on to the parts of the plant above the ground, in particular on to the leaves, up to the run-off point. The concentration for such agents lies between about 0.01% and 2%. These agents are prepared immediately before use from concentrates, the concentration of active ingredient of which is many times that of the agent to be applied and in cases of concentrates for the preparation of emulsions of liquid active ingredient and for the preparation of suspensions of solid active ingredient, the concentration can be as high as about 90%.

The following compounds for example can be used as active ingredients according to this invention:

1. O-phenyl carbamate _____ M. P. 142–143°.
2. O-phenyl-methyl carbamate _____ M. P. 85–87°.
3. O-phenyl-ethyl carbamate _____ B. P.$_{0.5}$ 91°.
4. O-phenyl-n-propyl carbamate ___ B. P.$_{0.06}$ 92–93°, M. P. 64–66°.
5. O-phenyl-n-butyl carbamate ____ M. P. 38–40°.
6. O-naphthyl-1-carbamate _____ M. P. about 160° on decomposition.
7. O-naphthyl-1-ethyl carbamate ___ M. P. 101–103°.
8. O-naphthyl-2-carbamate _____ M. P. 178–180°.
9. O-naphthyl-2-methyl carbamate _ M. P. 117–119.5°.

The active substances can be used in solvents, as emulsions or as dusting agents; the compounding of the active substances depends entirely on the intended use.

When it is intended to exert an inhibitory effect only on a part of the plant, as in blossom thinning or defoliation, or to a part of the vegetation of the area treated as in selective weed killing, then of course the auxiliary substance should not necessarily contribute by itself to the inhibitory action of the active ingredient.

On the other hand, if a general toxic action is the chief consideration, this can be increased by the choice of carrier substances which themselves have a phytotoxic action.

Solvents such as, in particular, alcohols; ketones such as acetone, diacetone alcohol or cyclohexanone; aliphatic hydrocarbons such as kerosene, and cyclic hydrocarbons such as benzene, toluene, xylene, tetrahydronaphthalene, alkylated naphthalenes, also chlorinated hydrocarbons such as tetrachlorethane, ethylene chloride and finally also high boiling organic solvents such as mineral and vegetable oils, or mixtures of the above named substances can be used for the production of solutions.

Chiefly emulsions and dispersions are meant by aqueous forms of application. The substances as such or in one of the above named solvents, are homogeneously incorporated into water, preferably by means of wetting or dispersing agents. On the other hand, concentrates suitable for dilution with water can be produced which consist of active ingredient, emulsifier or disperser and possibly, a solvent.

Quaternary ammonium compounds; soap, soft soap, aliphatic sulphuric acid monoesters having long chains, aliphatic aromatic sulphonic acids, alkoxy acetic acids having long chains; polyethylene ethers of fatty alcohols and polyethylene condensation products can be named as examples of cation active, anion active and non-ionogenic emulsifying or dispersing agents respectively.

Dusting agents can be made simply by mixing or grinding together the active ingredient and a solid carrier. As such solid carriers can be named: talcum, diatomaceous earth, kaolin, bentonite, calcium carbonate, boric acid, tricalcium phosphate, also powdered wood, powdered cork, charcoal and other materials of vegetable origin. On the other hand, the substances can also be drawn on to the carriers by means of a volatile solvent. Pulverulent preparations and pastes can be suspended in water by the addition of wetting agents and protective colloids and so used as spraying agents.

The various forms of application can be adapted to the intended use in the usual way by the addition of substances which improve the distribution, the adhesive properties, resistance to rain and, possibly, the penetrating powers. Such substances are, for example, fatty acids, resins, wetting agents, glue, casein or alginates. In the same way, the biological activity can be increased by the addition of substances which have a bactericidal or fungicidal action or of substances which also influence the growth of plants.

A few chosen examples follow which illustrate the range of application described above. The results obtained are also given.

*Example 1*

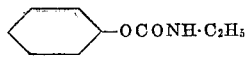

25–50 seeds on filter paper in petri dishes were treated with 5 ccm. of an emulsion containing 0.1% of active ingredient. Observation of the percentage of germinating seeds and of the top growth and root growths showed the following results:

Radish _____ 0
Cucumber _____ 4
Rye grass _____ 0

(10=normal growth, 0=no growth.)

O-phenyl-n-propyl carbamate has a similar selective inhibitory action on the germination and growth of plants.

*Example 2*

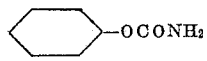

Test method as in Example 1.

Radish _____ 0
Cucumber _____ 0
Rye grass _____ 0

Germination of the above mentioned seeds is completely arrested.

What we claim is:

1. A method of inhibiting the growth of plants which comprises treating the plants with a compound of the formula:

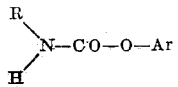

wherein Ar represents a member selected from the group consisting of the phenyl and the naphthyl radical and R represents a member selected from the group consisting of hydrogen and a lower straight chain alkyl radical, in an amount and concentration sufficient to inhibit the growth of the plants.

2. A method of inhibiting weed growth without influencing the growth of the crop plant which comprises treating the plant crop with a compound as defined in claim 1, in an amount and concentration sufficient to inhibit weed growth but not to influence the growth of the crop plant.

3. A method of eradicating plants of all kinds where no vegetation is wanted which comprises treating the plants with a compound as defined in claim 1, in an amount and concentration sufficient to eradicate living plants.

4. A plant growth inhibiting composition comprising in an amount and concentration sufficient to inhibit plant growth a compound of the formula:

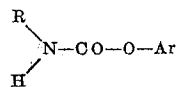

wherein Ar represents a member selected from the group consisting of the phenyl and the naphthyl radicals, and R represents a member selected from the group consisting of hydrogen and a straight chain lower alkyl radical, and a solid pulverent carrier.

5. A plant growth inhibiting composition comprising in an amount and concentration sufficient to inhibit plant growth a compound of the formula:

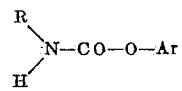

wherein Ar represents a member selected from the group consisting of the phenyl and the naphthyl radicals and R represents a member selected from the group consisting of hydrogen and a straight chain lower alkyl radical, and as carrier a surface active agent.

6. A plant growth inhibiting composition comprising in an amount and concentration sufficient to inhibit plant growth a compound of the formula:

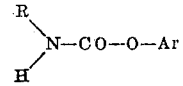

wherein Ar represents a member selected from the group consisting of the phenyl and the naphthyl radicals, and R represents a member selected from the group consisting of hydrogen and a straight chain lower alkyl radical, and as carrier a high boiling organic solvent.

7. A plant growth inhibiting composition comprising in an amount and concentration sufficient to inhibit plant growth N-n-propyl-O-phenyl carbamate and a solid pulverulent carrier.

8. A plant growth inhibiting composition comprising in an amount and concentration sufficient to inhibit plant growth O-phenyl carbamate and as a carrier a high boiling organic solvent.

References Cited in the file of this patent

UNITED STATES PATENTS 2,412,510    Jones _____ Dec. 10, 1946
2,677,698    Deutschman et al. _____ May 4, 1954

OTHER REFERENCES

Thompson et al.: "Botanical Gazette," vol. 107 (1946), pages 475–507.